Figure 2:
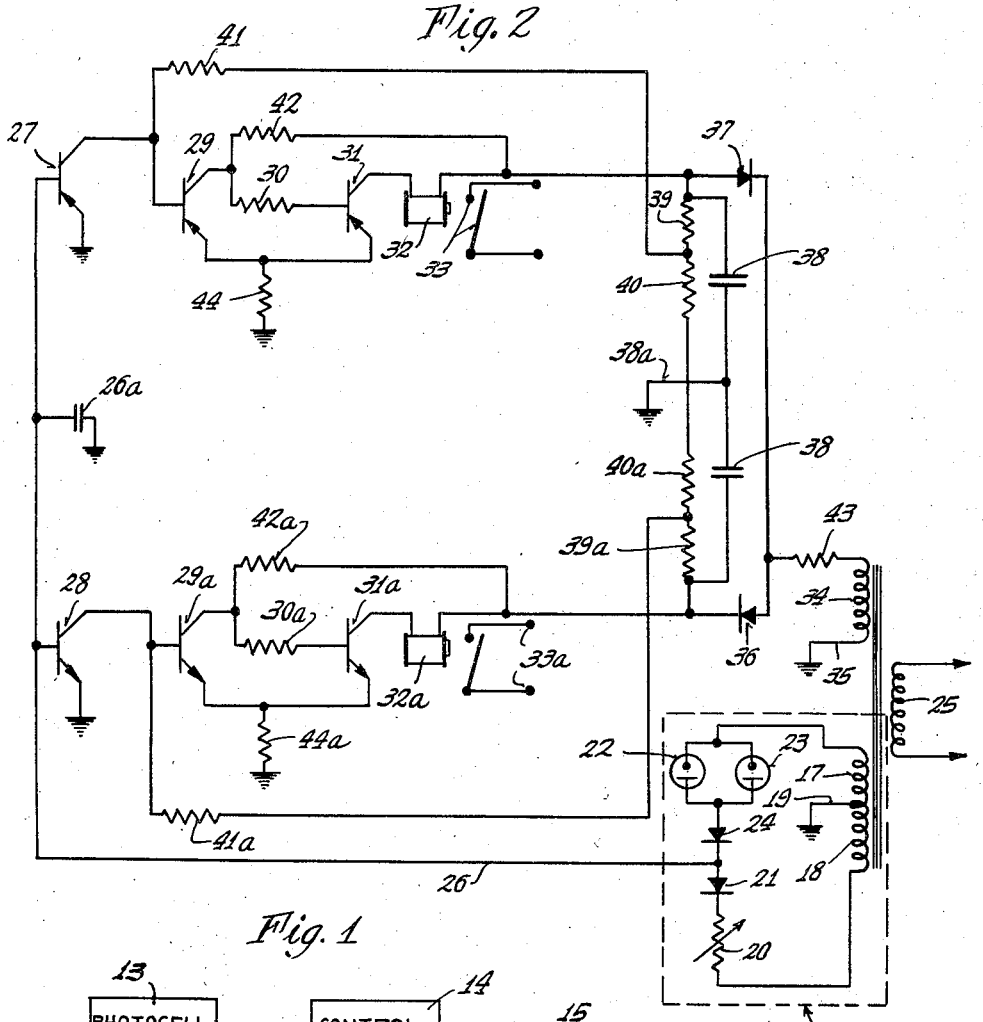

INVENTOR.
Owen J. McCabe
BY
Johnson and Kline
ATTORNEYS

June United States Patent Office 2,882,450
Patented Apr. 14, 1959

2,882,450

AUTOMATIC ILLUMINATING CONTROL UNIT

Owen J. McCabe, Bristol, Conn., assignor to The Superior Electric Co., Bristol, Conn., a corporation of Connecticut Application December 17, 1956, Serial No. 628,697

2 Claims. (Cl. 315—151)

The present invention relates to an illuminating control unit and, more particularly, to a unit which automatically maintains the total amount of illumination in a designated area at substantially a uniform level.

An object of the present invention is to provide an automatic control unit for varying the amount of illumination from an artificial source to maintain the total illumination consisting of both sunlight and artificial light, or just artificial light, at a predetermined level.

Another object of the present invention is the provision of a sensing device for detecting the deviation of the total amount of light from a predetermined level in which the sensing device has maximum sensitivity both to light waves near the red region and light waves near the violet region.

A further object of the present invention is the provision of two substantially distinct relay operating circuits with each circuit having inherent discrimination such that only one is capable of functioning when the total illumination varies from the predetermined level in one direction and the other circuit is capable of functioning only when the total illumination varies from the predetermined level in the other direction.

A further object of the present invention is to provide an amplifying circuit for controlling a relay in which the current through the relay is substantially either zero or maximum with the changeover having a substantially zero time constant.

Another object of the present invention is to provide an automatic lighting control unit which is extremely reliable in operation, even over an extended period of use, is economical to manufacture, and functions well for its intended purposes.

The lighting control unit of the present invention has particular adaptability to places where close or fine work is being done by human beings. Thus, the unit, for example, if functioning in a school room or a drafting room, etc., will serve to maintain the total illumination in the room at the same level irrespective of changes in the amount of light received from the sun into the room. The deviations in the amount of light from the sun may be caused by clouds, movement of the sun, window shades, Venetian blinds, etc., and the total illumination in the room is caused to remain the same by varying the amount of illumination from an artificial source, such as fluorescent or filament lamps located in the room. Accordingly, the present device provides for initially sensing the deviation of the total amount of illumination present from a predetermined level and then automatically adjusts the amount of light from artificial sources within the room to a point which makes the total amount of light in the room attain substantially the predetermined level.

Other features and advantages will hereinafter appear.

Figure 1:
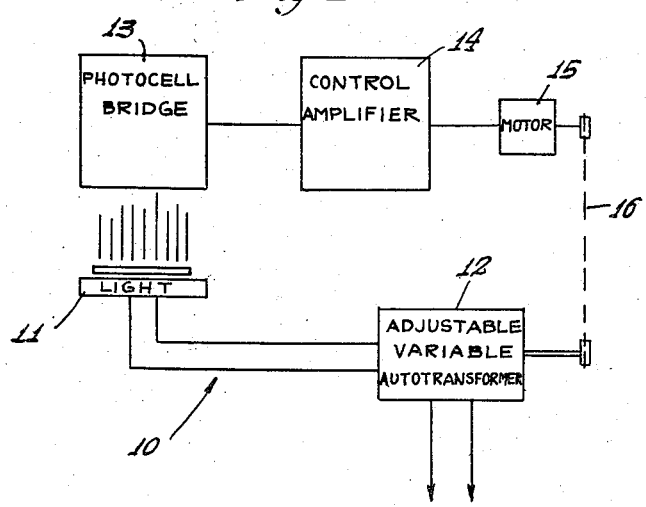

In the accompanying drawing, Figure 1 is a block diagram of the illuminating control unit and Fig. 2 is an electrical schematic diagram of the sensing circuit and motor control circuit.

Referring to the drawing, Fig. 1 in particular, the automatic illuminating control unit of the present invention is generally indicated by the reference numeral 10 and includes as components an artificial light source 11 which is preferably electrical lamps and an adjustable variable autotransformer 12 for varying the voltage to the lamps 11 and consequently the amount of light therefrom. A light-sensitive bridge circuit generally indicated by the reference numeral 13, is provided which senses the amount of illumination present from a predetermined level and transmits this to a control amplifier 14 which, in turn, actuates a reversible electric motor 15. The motor, as by a chain or other driving linkage, indicated generally by the reference numeral 16, is used to vary the autotransformer 12. Accordingly, as the light varies in a room from a predetermined level as sensed by the light-sensitive bridge 13, the output of the bridge is detected and amplified by the control amplifier, to operate relays to actuate the motor which in turn adjusts the adjustable autotransformer and varies the amount of illumination from the lights 11 to maintain the total illumination present at substantially the predetermined level. It is contemplated that in certain installations, as, for example, at night, the total illumination will be that derived solely from the lights 11 while during the day, on certain exposures, the amount of illumination present at the predetermined level may be totally derived from the sun and, accordingly, none would be needed from the lights 11.

The bridge circuit 13, shown schematically in Fig. 1, contains the elements enclosed within the broken line rectangle. There is provided a transformer winding which is divided into two substantially equal legs 17 and 18 by a tap 19 connected to the ground. These legs constitute the fixed ratio arms of a bridge and though in the instant embodiment are indicated as being equal, other ratios thereof may be utilized if desired. In one of the other legs of the bridge a variable resistor 20 is positioned in series with a negative rectifier 21. The last leg of the bridge includes two photo-conductive cells 22 and 23 and a positive rectifier 24. A primary winding 25 of a transformer which may be connectible to a source of an alternating current provides for the necessary electrical current in the windings 17 and 18. The photo-conductive cell 22 is cadmium sulfide and the cell 23 is cadmium selenide. The sulfide cell has its maximum sensitivity located near the violet region of the visible spectrum while the selenide cell has its maximum sensitivity adjacent the red region of the visible spectrum. The sensitivity of each cell falls off rapidly when the light present is outside of the area in which the cell has maximum sensitivity while the human eye, which cannot distinguish between light at the two regions, senses only the total illumination present. Accordingly the use of two cells having the above characteristics senses the total illumination present as it appears to the human eye. The cells utilized in the specific embodiment of the present invention have the inherent characteristic of having their resistance reduced upon being subjected to light. These cells are shown in the instant embodiment as being connected in parallel, through it is within the scope of the present invention to connect them in series if desired since either connection provides for a known relationship between the resistance of the legs and the amount of light falling on the cells.

As shown, the bridge 13 is energized by alternating current through the windings 17 and 18. The output circuit of the bridge includes a lead 26 and the tap 19. Connected in parallel across the output are transistors 27 and 28. If desired, a ripple filter capacitor 26a, may also be incorporated in the output circuit. Since the variation of illumination from a predetermined level may be either greater or less than the level, the output or signal from the bridge has to be indicative of the direction of change and thus the signal may be either positive or negative while the control amplifier or amplifying circuit for actuating the motor has to distinguish between these two polarities. Accordingly, the amplifying circuit is capable of distinguishing when the signal is positive i.e., when the line 26 is positive with respect to the tab 19 or ground, and when the signal is negative i.e., when the line 26 is negative with respect to the ground and there are thus provided two distinct channels for amplifying the sensing voltage. The initial connection of each channel to the bridge 13 is such that inherent discrimination is present so that the channel will only accept and hence be activated by the correct polarity of the output signal for which it was designed. The initial connection for accepting only a negative signal from the bridge 13 is a P.N.P. transistor and the initial connection for the channel accepting the positive signal is an N.P.N. transistor. The P.N.P. transistor is indicated by reference numeral 27 and the N.P.N. by the reference numeral 28.

As mentioned previously, the bases of the transistors 27 and 28 are connected in parallel to the line 26 while the emitters are connected to the ground. Referring to the transistor 27, the collector thereof is connected to the base of a second P.N.P. transistor 29. The collector of the transistor 29 is connected through a resistance 30 to the base of a third P.N.P. transistor 31. The collector of the transistor 31 is in series with a relay 32 which operates switch contacts 33 for controlling the energization and hence rotation in one direction of the motor 15.

The power for energizing the channel and operating the relay 32 is derived from a winding 34 mounted on a magnetic core to have electrical energy induced therein from the winding 25. One end of the winding 34 is grounded as at 35 and the other end is connected to a parallel connection having a positive rectifier 36 and a negative rectifier 37. A pair of power supply filter capacitors 38 are provided and are grounded as at 38a. A plurality of resistors 39, 40, 40a and 39a are connected in series across the rectifiers 36 and 37 and these resistors constitute a voltage divider to provide bias voltages in the amplifying circuit. A bias resistor 41 is connected between the base of the transistor 29 and a connection between the resistors 39 and 40. The collector of the transistor 29 is connected to a load resistor 42 and hence to one side of the power supply and through the resistor 30 to the base of the transistor 31. The emitters of the transistors 29 and 31 are connected through a common emitter resistance 44 to the ground.

A peak current limiting resistance 43 is positioned between the rectifiers 37 and 38 and the winding 34.

The other channel for driving the motor in the reverse direction is similarly constructed and like elements are indicated by having the same reference numeral as in the previously disclosed channel; however, a suffix "a" has been added thereto. Accordingly, the switch terminals 33a are connected to the motor 15 to energize it to drive it in a reverse direction than that of the switch terminals 33.

The operation of the illuminating control unit is as follows. The variable resistance 20 whose value determines the predetermined level of illumination is set either by a dial, light meter, or by observation to have a value which causes the bridge 13 to be balanced when the amount of total illumination equals the predetermined level. When the bridge is balanced the lead 26 and the tap 19 have the same potential and there is no unbalanced current flowing in the bridge. There is no signal to the amplifying circuit and the output from the lamps remains the same.

When there is insufficient total illumination present, the photo conductive cells 22 and 23 respond by increasing their resistance which causes the bridge 13 to become unbalanced. The tap 19 becomes positive with respect to the lead 26. Thus, unbalanced current will flow, for the half cycle when the A.C. voltage is positive, from the ground or tap 19 through the transistors 27 and 28, the lead 26, the rectifier 21 and resistance 20. When the A.C. voltage is negative no current will flow in the bridge as it is blocked by the rectifiers 21 and 24. The ripple condenser 26a is of such a size that it serves to smooth the current pulsations.

With the lead 26 negative with respect to the tap 19, the bases of the transistors 27, 28 will be negative with respect to the emitters being positive. In addition, the collector of the transistor 28 has a positive voltage and the collector of the transistor 27 has a negative voltage. Accordingly, in the transistor 28, because the base is negative with respect to the emitter, there is a reduction in its quiescent current, while in the transistor 27, an increase of current is effected because of the opposite polarities. It will be apparent that the values of the electrical elements in the network are such that the quiescent current through the transistor 28 is not sufficient to actuate the transistor 29a and that a lesser value thereof obviously will not.

Upon the negative signal being impressed on the base of the transistor 27, the current from the emitter to the collector is increased which causes a decrease in the current between the base and emitter of the transistor 27, since the two transistors are mounted in parallel. In this channel having the transistor 27, the ground is positive by reason of the rectifiers 36 and 37 and the winding 34. A decrease in the current between the emitter and base of the transistor 29 decreases the current between the emitter and collector of transistor 29 which produces an increased potential between the point A and the ground. This increased potential is transmitted to the base of transistor 31. In addition, when the current through the transistor 29 decreases, the voltage drop across the resistance 44 decreases by reason of the decreasing current therethrough which creates a larger potential between the base and emitter of the transistor 31. Accordingly, there is in effect accumulative increase in voltage between the base and emitter of the transistor 31 caused by the increase in potential at the point A and the lessening of the voltage drop through the resistance 44. This causes current through the base of the transistor 31 which is sufficient to enable maximum current flow between the collector and emitter of the transistor 31 to actuate the relay 32 to close the switch contacts 33. The motor 15 is thus energized to increase the voltage to the lamps which increases their light output. When the bridge again balances because of the increase in total illumination so that there is no potential difference between lead 26 and tap 19, the converse of the above operation occurs which causes substantially zero current to flow through the emitter and collector of the transistor 31. The resistances 29, 40 and 41, when the bridge is balanced have values which put a bias on the base and emitter of the transistor 29 such that substantially zero current is passed between the emitter and collector and the transistor 31. Thus this transistor has substantially zero current therethrough or else full current therethrough. The time to change from zero to full load current and the reverse is substantially instantaneous because of the cumulative increase in potential between the base and emitter of the transistor 31. Thus the circuit has a substantially zero time constant. When there is too much light the cells 22 and 23 decrease in resistance causing the lead 26 to become positive with respect to the tap 19. This puts a positive signal on the base of the transistor 28 which serves to actuate this channel in a manner such as explained above having the transistor 27 as the acceptor of the signal.

In the embodiment shown one set of values of the elements which has been found to be satisfactory is as follows: 41, 41a—10K ohms; 42, 42a, 30, 30a—5K ohms; 44, 44a—15 ohms; 39, 39a—8.2K ohms; 40, 40a—2.2K ohms; 43—47 ohms; 20—100,000 ohm variable resistor; 26a—30 mfd.; 38—100 mfd.; 27, 29, 31—type 2N43 PNP transistor; and 28, 29a, 31a—type 2N169 NPN transistor.

There has thus been disclosed a completely automatic light control unit which serves to vary the amount of illumination from an artificial source to maintain the given illumination in a room substantially constant. In addition, a sensing bridge which has maximum sensitivity at the extremes of the visible spectrum is utilized to correlate the sensing bridge with the illumination perception of the human eye. The signal from the sensing bridge is led to an amplifier which has inherent discrimination by reason of having two channels, one channel operating to increase the light from the artificial source and the other channel operating to decrease the light. Each channel is constructed to operate a relay by either having a zero current through the relay when the relay is not actuated or by having a full current through the relay when the relay is actuated with a substantially zero time constant between zero and full load current.

Variations and modifications may be made within the scope of the claims and portions of the improvements may be used without others.

I claim:
1. An automatic light regulating circuit for adjusting the amount of light from an electric lamp to maintain constant the total illumination in an area which also normally receives a variable amount of light from a different source comprising a photocell having a variable responsive to the amount of light impinging thereon, said photocell being located to be sensitive to the light in the said area; a sensing Wheatstone bridge formed of two pairs of opposite legs with the cell being electrically connected in one leg and having an output, means for electrically energizing the bridge, said bridge being normally balanced at a selected value of the variable of said photocell and producing an output signal which varies in polarity with the change in the variable of the photocell from the selected value; an amplifying circuit electrically connected to receive the output signal from the bridge including a pair of normally open relays, a relay energizing circuit for each relay, means in each circuit for rendering said circuit operative to energize its relay for a signal of only one polarity with the polarity of the signal rendering one circuit operative being the opposite of the signal rendering the other circuit operative; a reversible electrical motor; a source of electrical energy; connections connecting the source to said motor through one relay which when closed energizes the motor to cause movement in one direction and connecting the source to said motor through the other relay which when closed energizes the motor to cause movement in the other direction; an adjustable autotransformer having an input, an output and an operating shaft, means interconnecting the shaft and motor to cause operation of the autotransformer shaft by the motor; at least one electric lamp positioned to direct light upon the area; and means connecting the lamp to the output of the autotransformer and the input to the source of electrical energy whereby a change in the illumination in the area alters the variable of the photocell to cause the autotransformer to regulate the amount of illumination from the electric lamp thereby maintaining substantially constant the amount of illumination in said area.

2. The invention as defined in claim 1 in which one leg of the bridge includes an adjustable resistance for enabling adjusting the balance of the bridge to be at a different selected value of the variable of the photocell thereby enabling adjusting the total amount of illumination which is maintained constant.

References Cited in the file of this patent
UNITED STATES PATENTS

| | | |
|---|---|---|
| 2,088,466 | Diamond | July 27, 1937 |
| 2,155,984 | Shivers | Apr. 25, 1939 |
| 2,346,794 | Seeger | Apr. 18, 1944 |
| 2,434,101 | Cann | Jan. 6, 1948 |
| 2,573,554 | Dwyer | Oct. 30, 1951 |
| 2,782,267 | Beck | Feb. 19, 1957 |
| 2,784,262 | Crow | Mar. 5, 1957 |